(12) United States Patent
Serkh et al.

(10) Patent No.: US 6,361,459 B1
(45) Date of Patent: Mar. 26, 2002

(54) TENSIONER

(75) Inventors: Alexander Serkh, Troy; Andrzej Dec, Rochester Hills; David Hanes, Troy, all of MI (US)

(73) Assignee: The Gates Corporation, Denver, CO (US)

( * ) Notice: Subject to any disclaimer, the term of this patent is extended or adjusted under 35 U.S.C. 154(b) by 0 days.

(21) Appl. No.: 09/549,258

(22) Filed: Apr. 14, 2000

(51) Int. Cl.[7] ............................. F16H 7/12; F16H 7/08
(52) U.S. Cl. ..................... 474/133; 474/109; 474/135
(58) Field of Search .............................. 474/101, 110, 474/133, 135, 136, 138, 109

(56) References Cited

U.S. PATENT DOCUMENTS

| | | | | |
|---|---|---|---|---|
| 1,815,954 A | * | 7/1931 | Opie | 474/138 |
| 4,402,677 A | | 9/1983 | Radocaj | 474/138 |
| 5,021,032 A | * | 6/1991 | Macchiarulo et al. | 474/138 |
| 5,234,385 A | * | 8/1993 | Kawahima et al. | 474/135 |
| 5,439,420 A | | 8/1995 | Meckstroth et al. | 474/133 |
| 5,470,280 A | * | 11/1995 | Ayukawa | 474/135 |
| 5,795,257 A | * | 8/1998 | Giese et al. | 474/109 |
| 5,951,423 A | | 9/1999 | Simpson | 474/109 |

* cited by examiner

*Primary Examiner*—David A. Bucci
*Assistant Examiner*—Timothy McAnulty
(74) *Attorney, Agent, or Firm*—J. A. Thurnau, Esq.; C. H. Castleman, Esq.; S. G. Austin, Esq.

(57) ABSTRACT

The invention comprises a self-contained mechanical belt tensioner that produces damping which is a function of the applied hubload through the effect of frictional forces derived from the sliding action of mutually opposing wedges. A first wedge or conical piston is contained within a housing. The conical piston cooperates with a second or conical wedge. A surface of the conical wedge slides on the inner surface of the housing. The conical wedge is expandable in a direction normal to the inner surface of the housing. A spring urges the conical wedge into engagement with the conical piston. As the pulley is loaded, as with an impulse load, the piston will move into the conical wedge. This, in turn, will cause the conical wedge to expand against the inner surface of the housing. The expansion of the conical wedge in the housing will increase the frictional force between the conical wedge and the housing. This will have the effect of damping movements of the conical piston and, in turn, of the pulley. The greater the impulse, then the greater the expansion of the conical wedge. This increases the resultant frictional force resisting movement between the conical wedge and the housing. As the load moves toward a minimum, the frictional force is abated to a low level allowing ease of retraction of the piston.

16 Claims, 7 Drawing Sheets

TENSIONER

FIELD OF THE INVENTION

The invention relates to tensioners, more particularly to tensioners that are spring biased, wedge actuated belt tensioning devices having damping and used with belts for vehicle accessory drives.

BACKGROUND OF THE INVENTION

Most engines used for automobiles and the like include a number of belt driven accessory systems which are necessary for the proper operation of the vehicle. The accessory systems may include an alternator, air conditioner compressor and a power steering pump.

The accessory systems are generally mounted on a front surface of the engine. Each accessory would have a pulley mounted on a shaft for receiving power from some form of belt drive. In early systems, each accessory was driven by a separate belt that ran between the accessory and the crankshaft. With improvements in belt technology, single serpentine belts are now used in most applications. Accessories are driven by a single serpentine belt routed among the various accessory components. The serpentine belt is driven by the engine crankshaft.

Since the serpentine belt must be routed to all accessories, it has generally become longer than its predecessors. To operate properly, the belt is installed with a pre-determined tension. As it operates, it stretches slightly. This results in a decrease in belt tension, which may cause the belt to slip. Consequently, a belt tensioner is used to maintain the proper belt tension as the belt stretches during use.

As a belt tensioner operates, the running belt may excite oscillations in the tensioner spring. These oscillations are undesirable, as they cause premature wear of the belt and tensioner. Therefore, a damping mechanism is added to the tensioner to damp the oscillations.

Various damping mechanisms have been developed. They include viscous fluid based dampers, mechanisms based on frictional surfaces sliding or interaction with each other, and dampers using a series of interacting springs.

Representative of the art is U.S. Pat. No. 4,402,677 (1983) to Radocaj which discloses a tensioner having an L-shaped housing. A pair of cam plates having camming surfaces are slideably mounted in the L-shaped housing. A compression spring biases the camming plates into sliding engagement with each other. The included angle of the camming surfaces equal 90° with the angle of a first camming surface being greater than the angle of a second camming surface.

Also representative of the art is U.S. Pat. No. 5,951,423 (1999) to Simpson which discloses a mechanical friction tensioner having spring loaded wedge-shaped blocks and friction damping. The tensioner has a wedge-shaped piston that interacts with spring biased wedge-shaped blocks. As the piston moves inward the wedge-shaped blocks are pushed outward to provide friction damping.

The prior art devices rely on springs or other components, each oriented on axes that are set at a pre-determined angle to each other. They also rely on a plurality of springs to properly operate the damping components and to urge the belt pulley into contact with a belt. The prior art does not teach a damping components that operate coaxially. Further, the prior art does not teach use of an expandable camming body. Nor does it teach the use of an expandable camming body that expands radially. Nor does it teach the use of an expandable camming body that expands radially in response to movement against a piston. Nor does it teach the use of an expandable camming body that expands radially in response to movement against a tapered piston.

What is needed is a tensioner having a coaxial piston and camming body operating coaxially. What is needed is a tensioner having an expandable camming body. What is needed is a tensioner having an expandable camming body that is radially expandable. What is needed is a tensioner having an expandable camming body that is radially expandable in response to movement against a piston. What is needed is a tensioner having an expandable camming body that expands radially in response to movement against a tapered piston. The present invention meets these needs.

SUMMARY OF THE INVENTION

The primary aspect of the invention is to provide a tensioner having a coaxial tapered piston and camming body.

Another aspect of the invention is to provide a tensioner having an expandable camming body.

Another aspect of the invention is to provide a tensioner having an expandable camming body that is radially expandable.

Another aspect of the invention is to provide a tensioner having an expandable camming body that is radially expandable in response to movement against a piston.

Another aspect of the invention is to provide a linear tensioner having an expandable camming body that expands radially in response to movement against a tapered piston.

Other aspects of the invention will be pointed out or made obvious by the following description of the invention and the accompanying drawings.

The invention comprises a self-contained mechanical belt tensioner that produces damping which is a function of applied hubload through the effect of frictional forces derived from the sliding action of mutually opposing wedges. A conical piston is contained within a housing. The conical piston cooperates with a conical wedge or camming body. The conical wedge slides on the inner surface of the housing. The conical wedge is radially expandable in a direction normal to the housing. A spring urges the conical wedge into engagement with the conical piston. As the pulley is loaded, as with an impulse load, the piston will move into the conical wedge. This, in turn, will cause the conical wedge to radially expand against the inner surface of the housing. The expansion of the conical wedge in the housing will increase the frictional force between the conical wedge and the housing. This will have the effect of damping movements of the wedge and conical piston. The greater the impulse, then the greater the expansion of the conical wedge. Hence, this increases the resultant frictional force resisting movement between the conical wedge and the housing. As the load moves toward a minimum, the camming body radially contracts and the frictional force is abated to a low level allowing ease of retraction of the piston.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
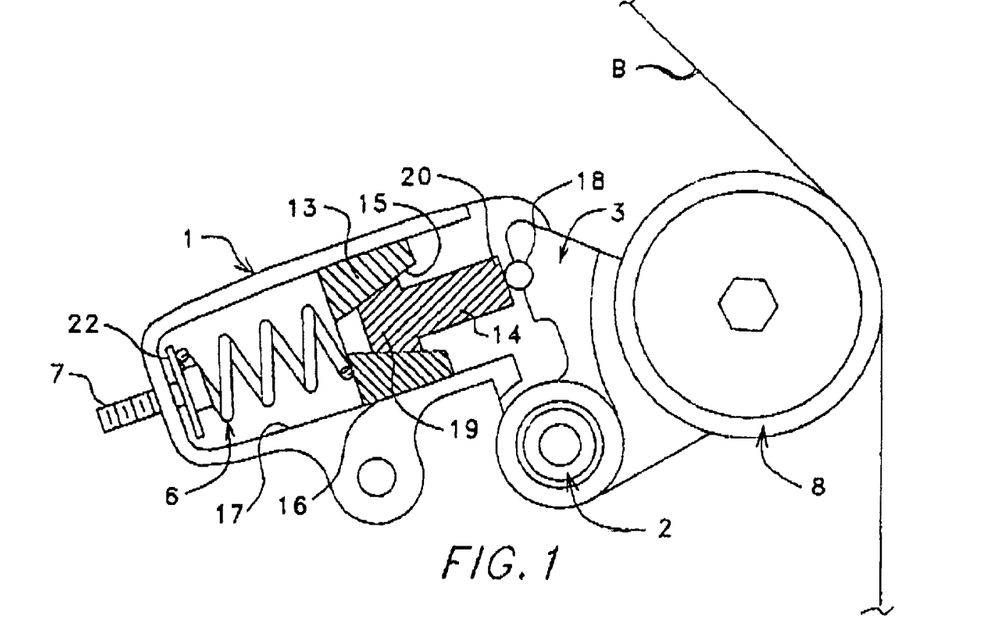
FIG. 1 is a cross-sectional view of the invention.

FIG. 1 is a cross-sectional view of the invention. A linear tensioner is shown having a damping section that is distinct from the pivot/pulley section. Housing 1 contains the damping components for the tensioner. Housing 1 in the preferred embodiment is cylindrical. However, housing 1 may have any shape generally compatible with the operation described herein. Pivot arm 3 is pivotably connected to housing 1. Pulley 8 is journaled to pivot arm 3. Pulley 8 engages a belt B to be tensioned. Adjuster or adjusting screw 7 having a flange is threaded into an end of housing 1 and is used to adjust or fine tune the spring preload force and hence the damping force by turning clockwise or counterclockwise as required by a user.

Compressible member or spring 6 bears on wedge 13. Wedge or camming body 13 comprises a tapered or conical hole 15. Wedge outer surface 16 is slidingly engaged with housing inner surface 17. Wedge outer surface 16 may comprise a nonmetallic material, such as plastic or phenolic. Piston 14 comprises a cylindrical shape. End 19 of piston 14 has a tapered or frustoconical shape that cooperates with hole 15 in wedge 13. End 20 of piston 14 opposite the conical end cooperates with bearing point 18. Bearing point 18 allows pivot arm 3 to press upon the end 20 of piston 14 without undue binding.

Figure 2A:
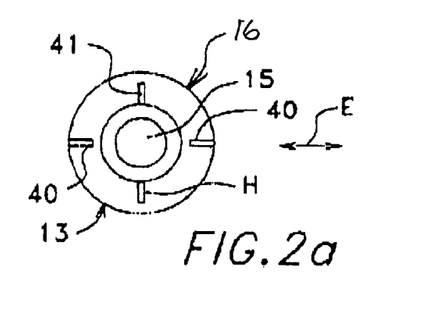
FIG. 2(a) is a top plan view of the wedge through section 2a—2a in FIG. 3.
Figure 3:
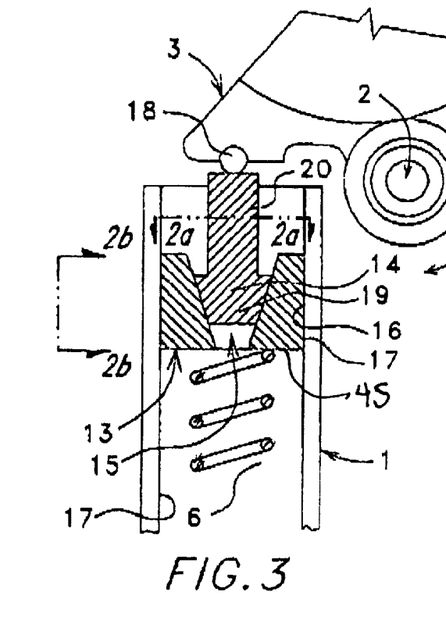
FIG. 3 is a side cross-section view of the damping section of the invention.

FIG. 2(a) is a top plan view of the wedge through section 2a—2a in FIG. 3. Wedge or camming body 13 comprises slots 40, 41. Slots 40 project from an outer surface of the wedge toward the hole 15. Slots 41 project from hole 15 toward an outer surface of the wedge. Slots 40, 41 allow wedge 13 to radially expand and contract, shown as bi-directional arrow E, as the tensioner operates according to the following descriptions. One should note that although the surface 16 is shown as smooth and of circular shape in this FIG. 2a, surface 16 may have other shapes or profiles as described in the other figures described in this specification.

Figure 2B:
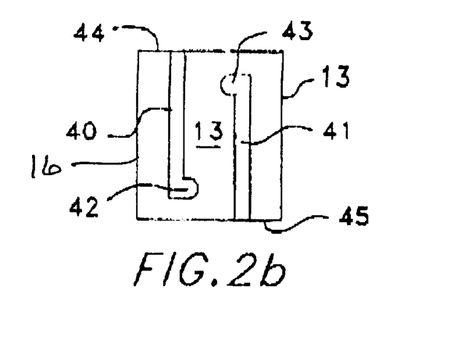
FIG. 2(b) is a side elevation view of the wedge through section 2b—2b in FIG. 3.

FIG. 2(b) is a side elevation view of the wedge through section 2b—2b in FIG. 3. Slots 40 extend from a first surface 44 of the wedge and slots 41 extend from an opposing surface 45 of the wedge as compared to the first surface. Slots 40, 41 further comprise holes 42, 43 respectively, which allow the wedge sides to expand and contract without causing cracking or failure of the wedge at each slot end.

FIG. 3 is a side cross-section view of the damping section of the invention as described in FIG. 1. Movement of the pivot arm 3 drives piston 14 into the wedge 13. Spring 6 biases wedge 13 into piston 14. In operation, piston 14 is driven into wedge 13, thereby expanding wedge 13 against surface 17. The frictional force between wedge surface 16 and surface 17 damps the motion of the wedge and thereby the motion of the piston 14. Note that although surface 17 is shown as cylindrical in this FIG. 3, surface 17 may have other shapes or profiles as shown in the other figures described in this specification.

Figure 4:
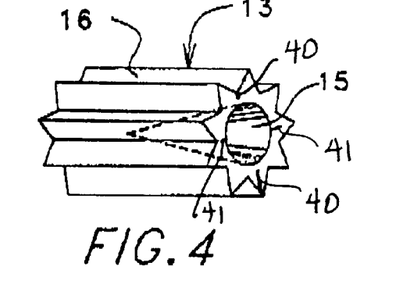
FIG. 4 is a perspective view of the wedge.

FIG. 4 is a perspective view of the wedge. Camming body or wedge 13 comprises surface 16 that slidingly engages inner surface 17 of housing 1. Wedge 13, and more particularly, surface 16 may have a pleated or star shape. This shape serves to increase the frictional forces, between surface 16 and inner surface 17. Inner surface 17 and surface 16 may have any shape, so long as they are able to be properly mated to maximize surface contact between them and are able to slide relative to each other along a common axis, A, without binding.

Figure 5:
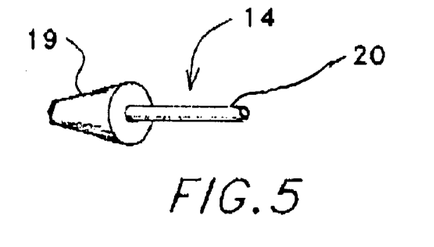
FIG. 5 is a perspective view of the piston 14.

FIG. 5 is a perspective view of the piston 14. Piston 14 comprises tapered end 19 and end 20. Tapered end 19 cooperates with tapered hole 15 in wedge 13. Bearing point 18 bears upon end 20. Although surface 16 is star shaped, tapered end 19 and tapered hole 20 each have a conical or frustoconcical shape. In the preferred embodiment, piston 14 comprises steel, although any durable material having similar frictional and compressive properties would be acceptable.

Figure 6:
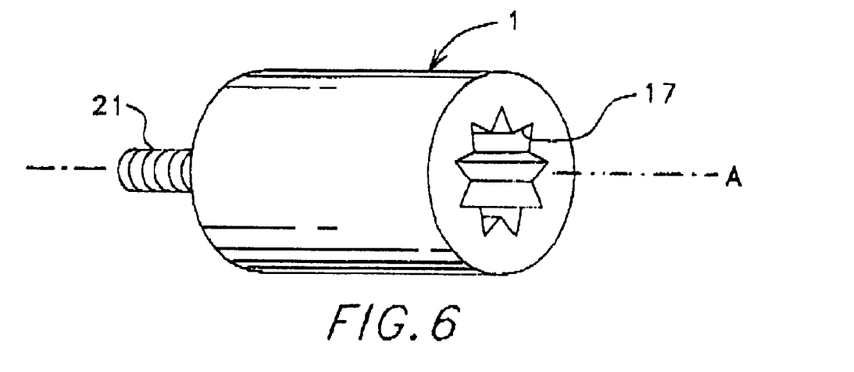
FIG. 6 is a perspective view of the housing 1.

FIG. 6 is a perspective view of the housing 1. Housing 1 comprises inner surface 17. Inner surface describes a pleated or star profile in order to cooperate with surface 16 of wedge 13. In the preferred embodiment, housing 1 is constructed of aluminum, although any durable material having similar frictional and strength bearing properties would be acceptable. Housing 1 may b attached to a base (not shown) as part of a tensioner assembly as shown in FIG. 1.

Figure 7A:
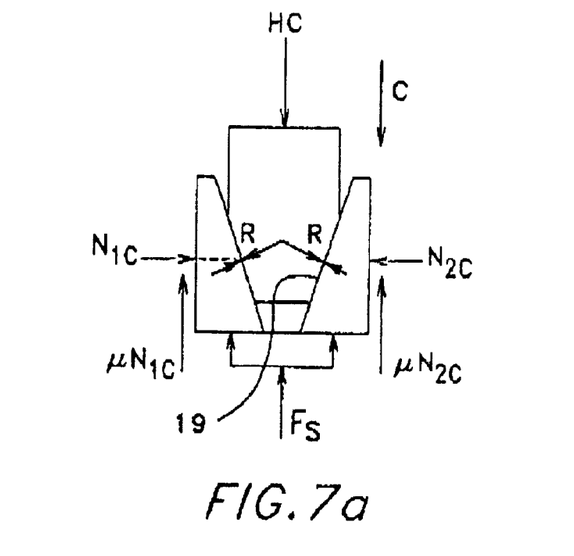
FIG. 7(a) is a schematic free body diagram of the damping mechanism during a compression stroke.

The operation of the tensioner is as follows. Reference is made to FIG. 7(a), a schematic free body diagram of the damping mechanism during a compression stroke. During the compression stroke, the hubload HC bears upon piston 14, which acts upon wedge 14, shown as R. The movement of the tapered end 19 into hole 15 causes an outer circumference of wedge 13 to increase and press surface 16 against the inner surface 17. Due to friction between the sides of the tapered end 19 and the sides of the tapered hole 15, movement of piston 14 in direction C acts to move wedge 13 also in direction C. However, the movement of wedge 13 in direction C is resisted by spring 6, the spring force being depicted as $F_s$. A normal force is formed between the sides of the tapered end 19 and the sides of the tapered hole 15, and is resolved into normal forces between them, $N_{1C}$ and $N_{2C}$. A frictional force acts between the sides of the tapered end 19 and the sides of the tapered hole 15 as well as between the sides of the wedge and the inner surface of the housing. A frictional force resisting the motion of the wedge in the housing is formed. These forces are $\mu N_{1C}$ and $\mu N_{2C}$. This force is additive with the spring force, $F_s$, as each acts in the same direction. As the hubload increases, so increases HC. An increase in HC increases $N_{1C}$ and $N_{2C}$ until wedge 13 starts moving, which in turn increases the friction forces $\mu N_{1C}$ and $\mu N_{2C}$ resisting movement of the wedge in the housing. It should be noted that there is no further substantive increase in $N_{1C}$ and $N_{2C}$ when wedge 13 moves.

Figure 7B:
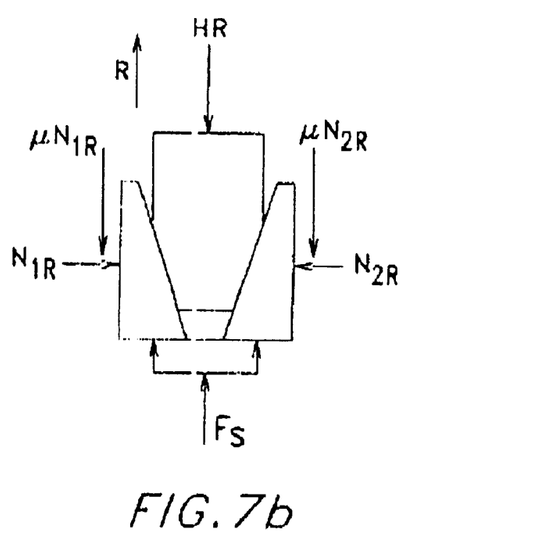
FIG. 7(b) is a schematic free body diagram of the damping mechanism during a return stroke.

On the return stroke, depicted in FIG. 7(b) a free body diagram of the damping mechanism during the return stroke, the hubload is diminished. Once the hubload HR becomes less than the spring force $F_s$ minus friction $\mu N_{1R}$, the wedge will be pushed in direction B. The normal forces, $N_{1R}$ and $N_{2R}$ are less than $N_{1C}$ and $N_{2C}$. Further, the friction force vector is in the opposite direction as compared to the compression stroke, $\mu N_{1R}$ and $\mu N_{2R}$. This frictional force resists the effort of the spring to move the wedge in direction B. The hubload HR required to keep the blocks in static equilibrium is reduced. Since the hubload is reduced, the frictional forces between the wedge and the inner surface of the housing are correspondingly reduced. Hence, the damping, or frictional force, is greater during the compression stroke than during the return stroke. Therefore, the tensioner exhibits asymmetric damping.

Figure 8:
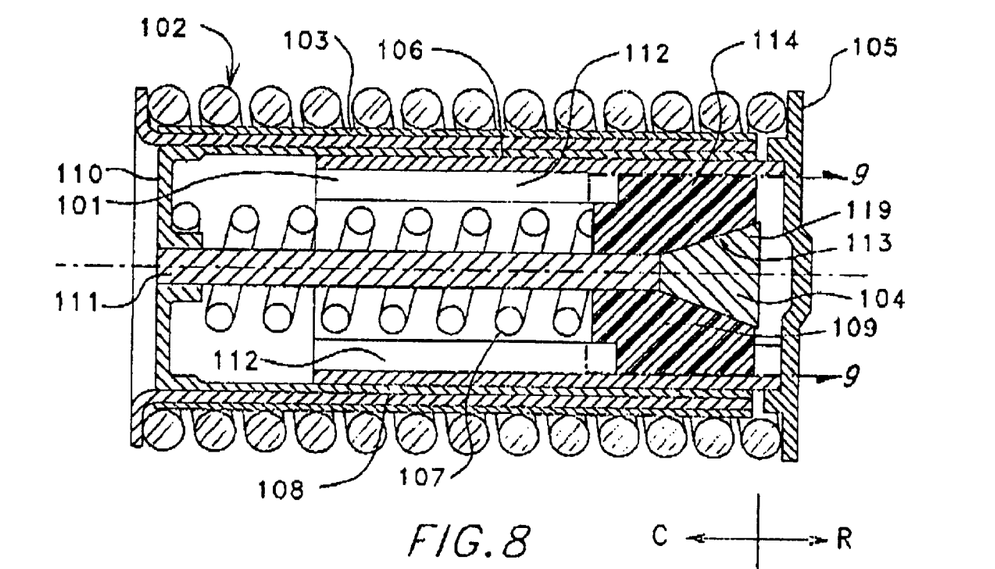
FIG. 8 is a cross-sectional view of a first alternate embodiment of the invention.

An alternate embodiment is depicted in FIG. 8. Damper 100 comprises a cylinder slidingly engaged with another cylinder. Outer tube or housing 101 slidingly engages tube 108. Cap 105 is attached to tube 101. Cap 110 is attached to tube 108. Spring 102 extends between cap 105 and end of tube 108, thereby urging the tubes apart. Plastic liner 106 facilitates movement between outer tube 101 and tube 108. Piston 111 is affixed to cap 110 and is parallel to a major axis of the tubes 101, 108. Wedge 109 slidingly engages an inner surface 112 of tube 108. Piston tapered end 104 engages tapered hole 113 in wedge 109. Wedge 109 is urged into contact with piston 111 by spring 107. Biasing member or spring 107 bears upon cap 110 and wedge 109. Cap 110 may be affixed to a mounting surface, such as on a tensioner body as described in FIG. 1.

In operation, cap 105 moves in direction C during a compression stroke. It moves in direction R during a return stroke. The detailed description of operation is set forth in FIG. 7(a) and FIG. 7(b). Further, during the compression stroke, the wedge 109 is pushed in direction C, thereby causing behavior as described in FIG. 7(b) for the return stroke. The damping force in is increased during the return stroke in direction R since the inner surface 112 is moving in a manner so as to press wedge 109 into the tapered end 119 of piston 104. This is described in FIG. 7(a). One skilled in the art will appreciate that the mechanism described in this FIG. 8 depicts a damping mechanism that is operable in various applications including a belt tensioner with a pulley.

Figure 9:
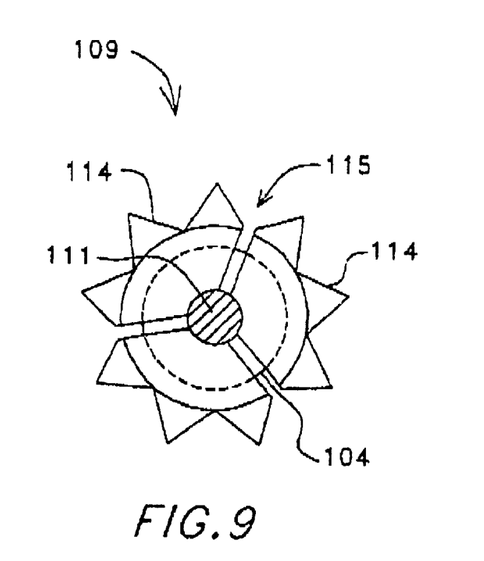
FIG. 9 is a plan view of the wedge for the alternate embodiment.
Figure 10:
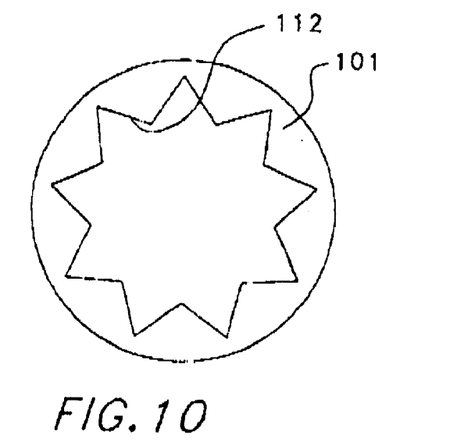
FIG. 10 is a cross-sectional view of the housing for the alternate embodiment.

FIG. 9 is a detail of the wedge in FIG. 8. Wedge 109 comprises splines or pleats 114. Splines 114 cooperatively engage a like shape on the inner surface 112 of tube 101 as shown in FIG. 10. Wedge 109 may have radially extending slots 115 that facilitate expansion of the wedge against the inner surface 112. Wedge splines 114 may comprise a nonmetallic material, such as plastic or phenolic.

Figure 20:
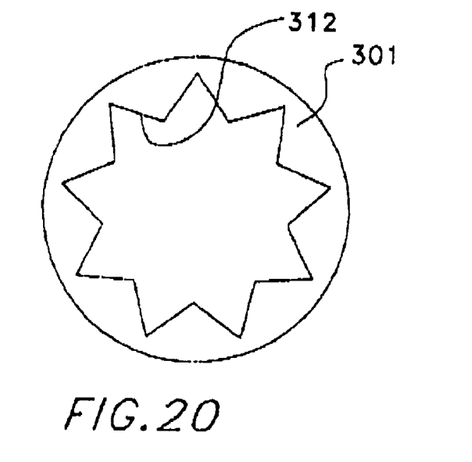
FIG. 20 is an end plan view of the tube of an alternate embodiment.

FIG. 10 is an end view of the outer tube. Tube 101 comprises inner surface 112. Surface 112 describes a pleated or splined profile that cooperatively engages splines 114 on wedge 104. Surface 112 and splines 114 each comprise materials that create a desired frictional coefficient. For example, the splines 114 may comprise a plastic, phenolic or non-metallic material while surface may comprise like materials. The preferred embodiment comprises a non-metallic material on splines 114 and a metallic material on surface 112, as well as surface 112 (FIG. 10), surface 212 (FIG. 11, 18), surface 312 (FIG. 20).

Figure 11:
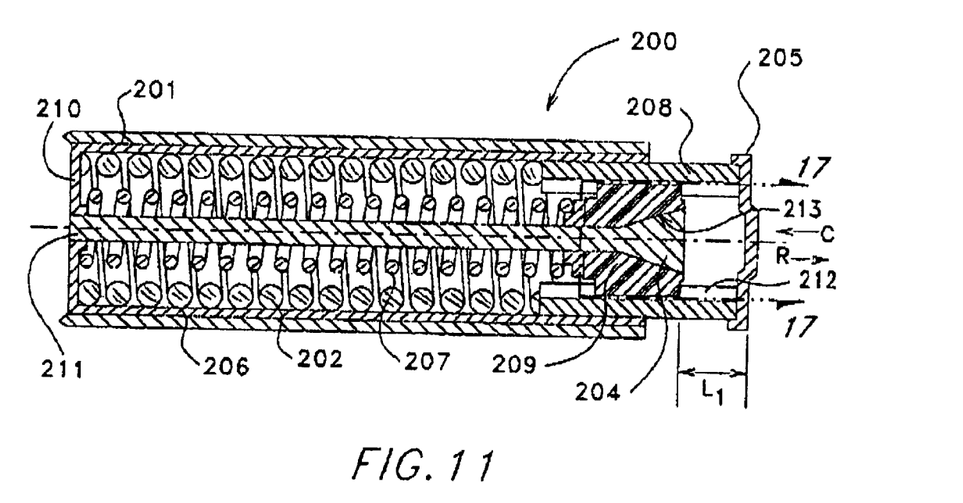
FIG. 11 is a cross-sectional view of a second alternate embodiment of the invention.

FIG. 11 is a cross-sectional view of a second alternate embodiment of the invention. In this alternate embodiment, spring 202 is contained within tube 201. Damper 200 comprises a cylinder slidingly engaged within another cylinder. Outer tube 201 slidingly engages tube 208. Cap 205 is attached to tube 208. Cap 210 is attached to tube 201. Biasing member or spring 202 extends between tube 208 and cap 210, thereby urging them apart. Plastic liner 206 facilitates sliding movement between outer tube 201 and tube 208. One end of piston 211 is affixed to cap 210 and is parallel to a major axis of the tubes 201, 208. Wedge 209 slidingly engages an inner surface 212 of tube 208. Piston tapered end 204 engages tapered hole 213 in wedge 209. Wedge 209 is urged against tapered end 204 by compressible member or spring 207. Spring 207 bears upon cap 210 and wedge 209. Cap 210 is affixed to a mounting surface, such as on a tensioner body as described in FIG. 1. One skilled in the art will appreciate that the mechanism described in this FIG. 11 depicts a damping mechanism that is operable on other applications including a tensioner with a pulley.

In operation, cap 205 moves in direction C during a compression stroke. Cap 205 moves in direction R during a return stroke. The detailed description of operation is set forth in FIGS. 7(a), 7(b) and FIG. 8.

Figure 12:
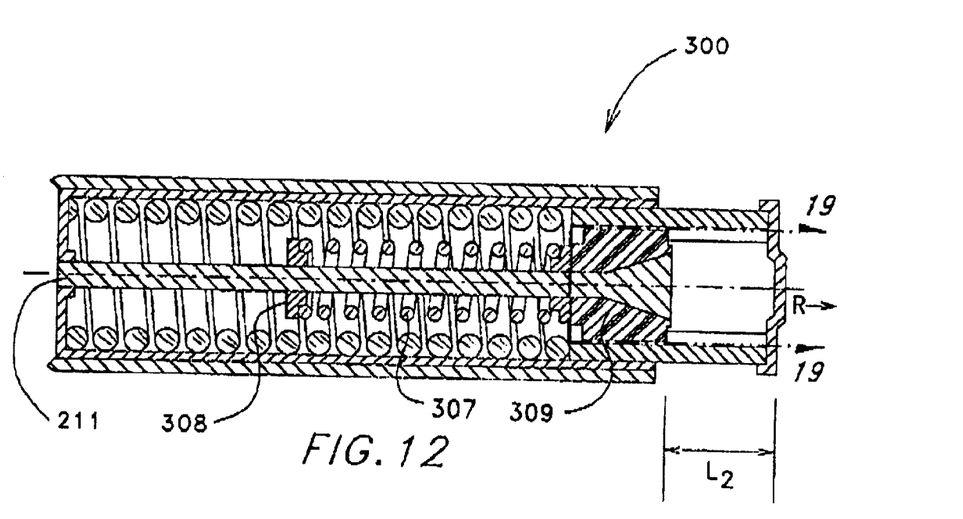
FIG. 12 is a cross-sectional view of a third alternate embodiment of the invention.

FIG. 12 depicts another alternate embodiment of the damper 300. The elements are generally as described in FIG. 11 with the following differences; washer, ring or bearing surface 308 is affixed to piston 211 at a pre-determined point. Bearing surface 308 extends normally to the piston axis D. Compressible member or spring 307 bears on the bearing surface 308. The other end of spring 307 bears on camming body or wedge 309. Wedge 309 is of substantially the same form as wedge 209 in FIG. 11. One skilled in the art will appreciate that the mechanism described in this FIG. 12 depicts a damping mechanism that is operable on other applications including a tensioner with a pulley.

Reference to FIG. 11 and FIG. 12 also illustrates the change in length $L_1$ and $L_2$ as the invention operates. Lengths increase during the return stroke R ($L_2$) and decrease during the compression stroke C ($L_1$).

Figure 13:
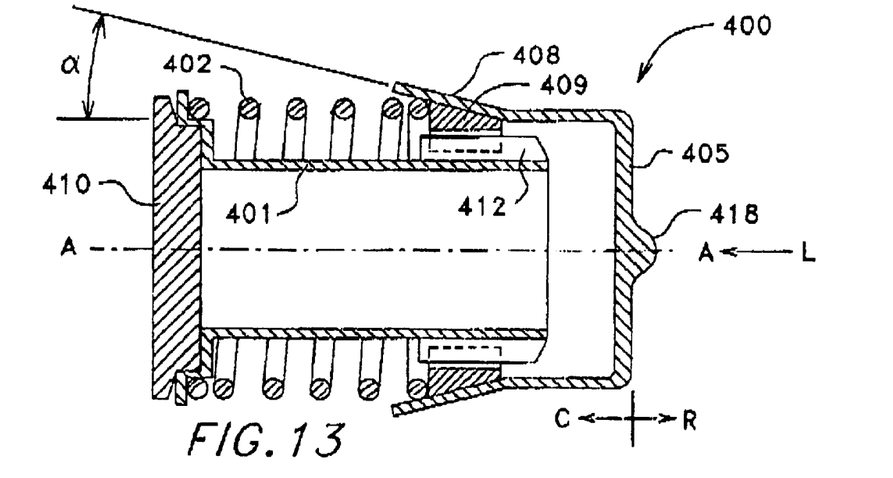
FIG. 13 is a cross-sectional view along axis A—A of a fourth alternate embodiment of the invention.

FIG. 13 is a cross-sectional view along axis A—A of yet another alternate embodiment of the invention. First housing or cap 405 comprises first housing surface or side 408. Second housing or tube 401 further comprises outer surface 412. Side 408 describes a conical form having an angle α to the major axis A in the range of 0° to 30°. Side 408 may have any form required by a user, including pleated. Wedge 409 slides between side 408 and outer surface 412. Spring 402 urges wedge 409 into contact with side 408 and outer surface 412. As wedge 409 is urged against surface 412, it is radially compressed. Radial compression of wedge 409 occurs due to the presence of the slots as described in FIG. 2 and FIG.

Figure 21:
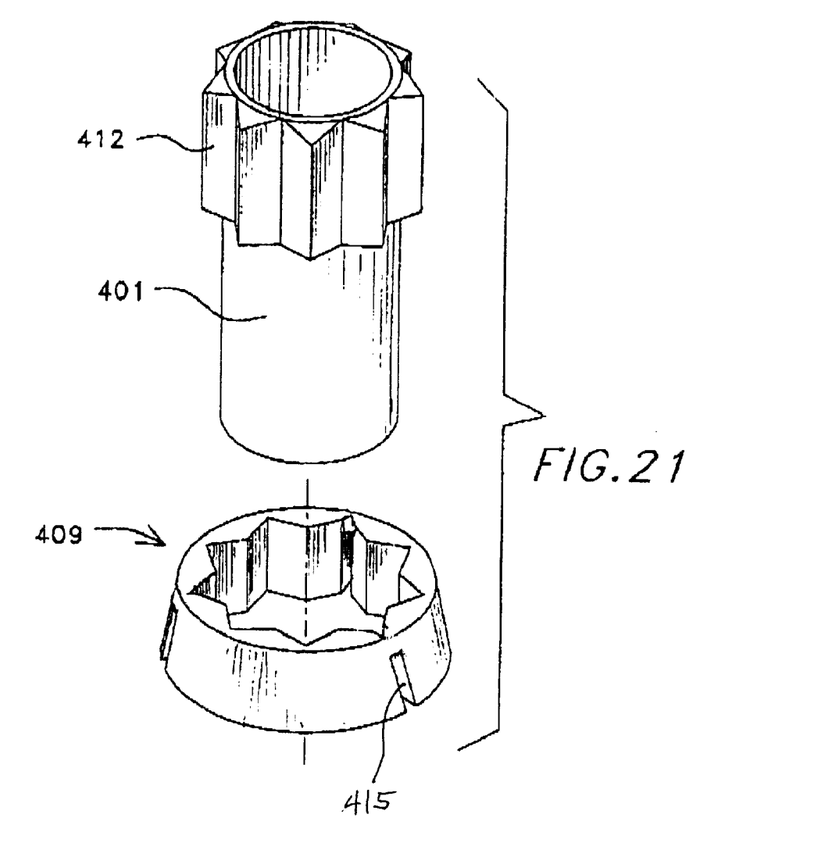
FIG. 21 is an exploded view of the wedge and tube for an alternate embodiment.

21. Spring 402 bears on base 410, which is affixed to tube 410. Cap 405 moves in direction C during a compression stroke and in direction R during a return stroke. A load L may be applied to the device at bearing point 418. One skilled in the art will appreciate that the mechanism described in this FIG. 13 depicts a damping mechanism that is operable on other applications including a tensioner with a pulley.

Figure 14:
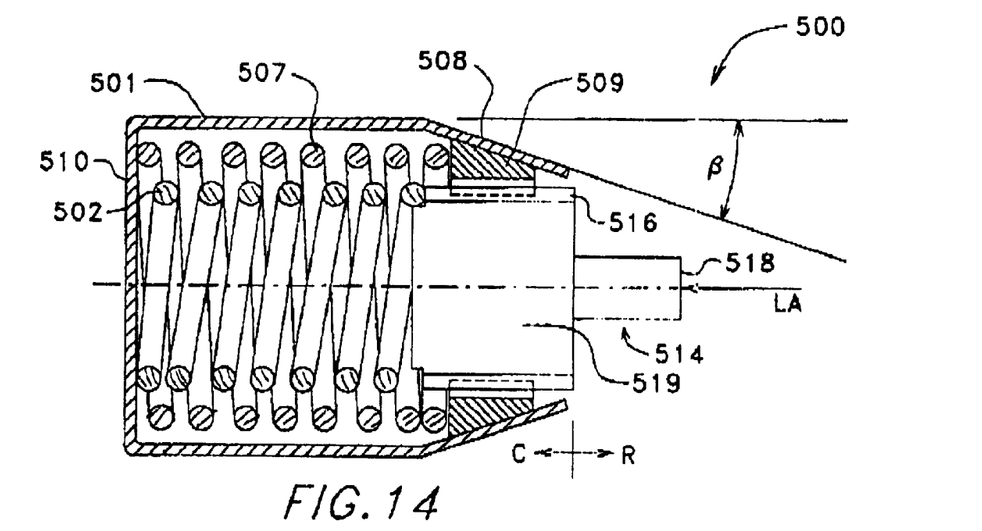
FIG. 14 is a cross-sectional view along axis A—A of a fifth alternate embodiment of the invention.

FIG. 14 is a cross-sectional view along axis A—A of yet another alternate embodiment of the invention. First housing or tube 501 comprises first housing surface or side 508 and end 510. Side 508 describes a conical form having an angle β to the major axis A in the range of 0° to 30°. Side 508 may have any profile required by a user including pleated. Wedge 509 slides between first housing surface or side 508 and outer surface 516 of piston 514. Wedge 509 has the same form as shown in FIG. 21 for wedge 409. Body 519 and surfaces 516 have the same form as shown in FIG. 21 for surface 412. Spring 502 bears on end 510 and piston 514. Spring 502 resists an axial movement of piston 514. Compressible member or spring 502 also bears on base 510 against piston 514. Compressible member or spring 507 urges wedge 509 into contact with side 508 and outer surface 516 of piston 514. As wedge 509 is urged against surface 516, it is radially compressed. Radial compression of wedge 509 occurs due to the presence of the slots as described in FIG. 2 and FIG. 21. Piston 514 moves in direction C during a compression stroke and in direction R during a return stroke. An axial load L may be applied to the device at bearing point 518. One skilled in the art will appreciate that the mechanism described in FIG. 14 depicts a damping mechanism that is operable on other applications including a tensioner with a pulley.

Figure 15:
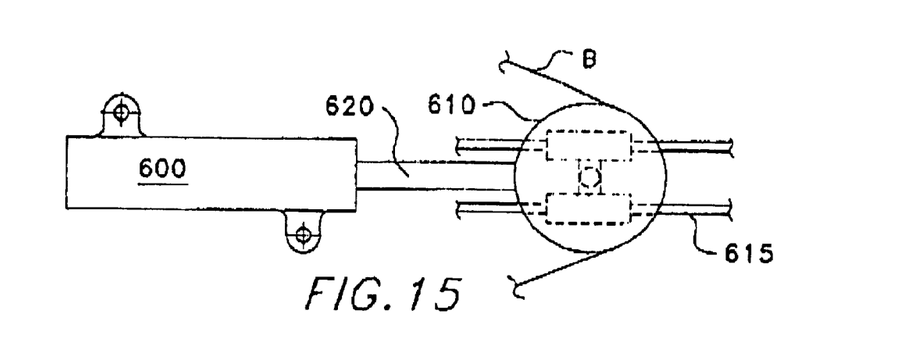
FIG. 15 is a plan view of a tensioner.

FIG. 15 is a plan view of a tensioner damper assembly. Damper 600 as described in the foregoing FIGS. 8, 11–14 is shown connected to an idler pulley 610 by shaft 620. Shaft 620 may be connected to a base (not shown) that connects the idler to tracks 615. Idler 610 slides along parallel tracks 615. Belt B is trained about idler 610.

Figure 16:
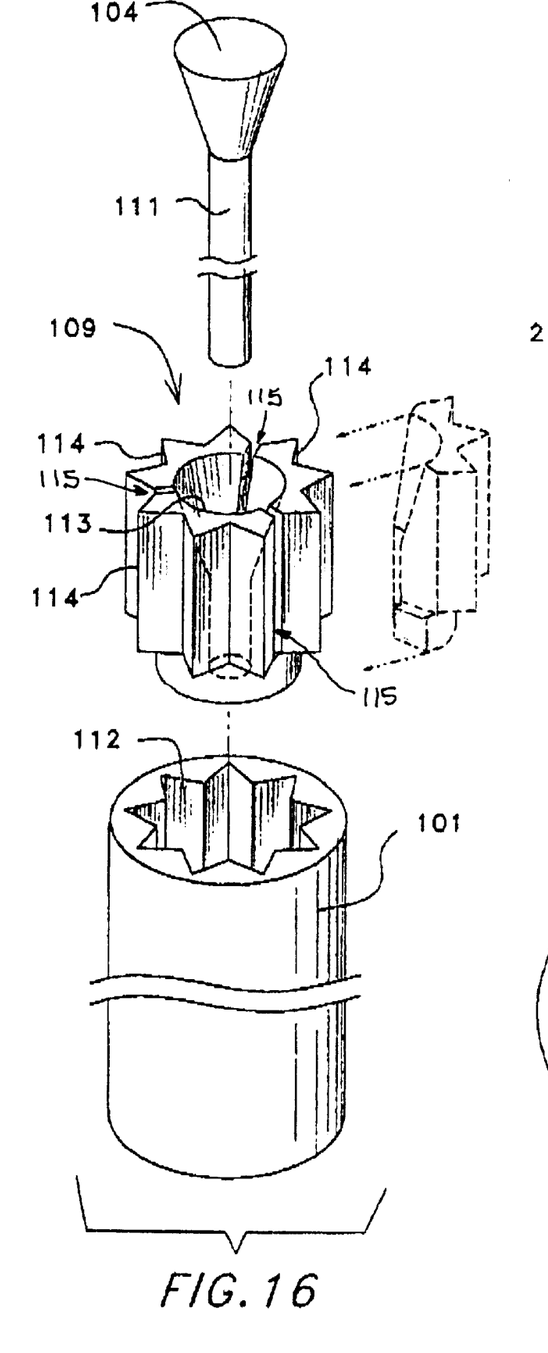
FIG. 16 is a perspective exploded view of the damping mechanism for an alternate embodiment.

FIG. 16 is a perspective exploded view of the damping mechanism for an alternate embodiment. FIG. 16 generally describes the arrangement of the damping mechanism for the embodiments depicted in FIGS. 8, 11 and 12. The numbers in FIG. 16 relate to FIG. 8. Surfaces 114 slidingly engage surfaces 112. Tapered end 104 engages hole 113. Slots 115 allow wedge 109 to radially expand as tapered end 104 moves axially into wedge 109. Wedge 109 may comprise a nonmetallic material, such as plastic or phenolic.

Figure 17:
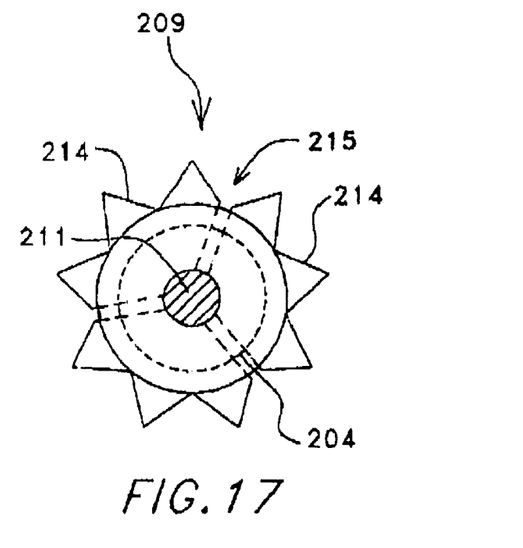
FIG. 17 is an end plan view of the wedge for an alternate embodiment.

FIG. 17 is an end plan view of the wedge for an alternate embodiment. The alternate embodiment is depicted in FIG. 11. Wedge splines 214 may comprise a nonmetallic material, such as plastic or phenolic.

Figure 18:
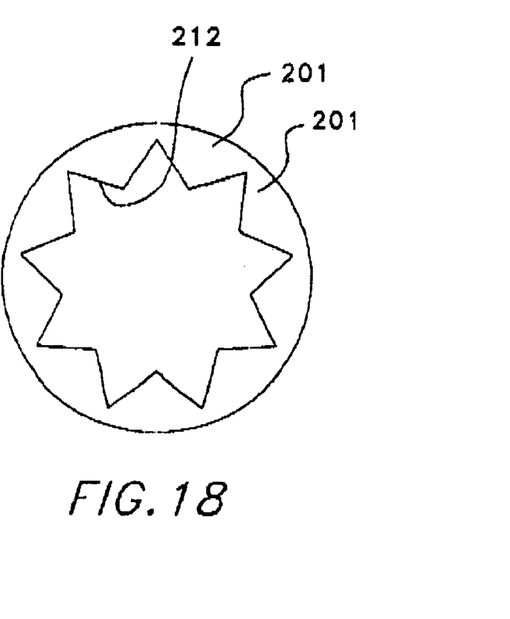
FIG. 18 is an end plan view of the tube of an alternate embodiment.

FIG. 18 is an end plan view of the tube of an alternate embodiment. The alternate embodiment is depicted in FIG. 11.

Figure 19:
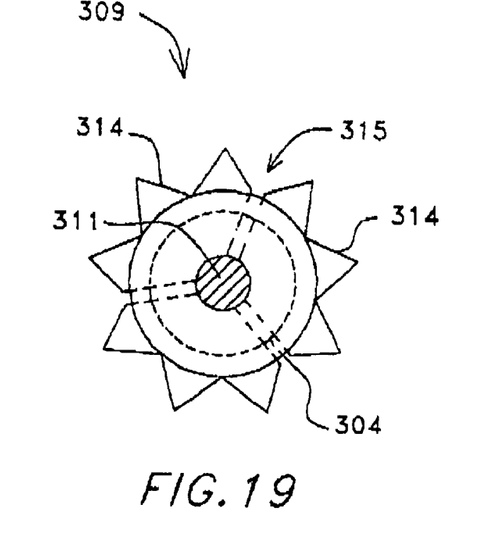
FIG. 19 is an end plan view of the wedge for an alternate embodiment.

FIG. 19 is an end plan view of the wedge for an alternate embodiment. The alternate embodiment is depicted in FIG. 12. Wedge splines 314 may comprise a nonmetallic material, such as plastic or phenolic.

FIG. 20 is an end plan view of the tube of an alternate embodiment. The alternate embodiment is depicted in FIG. 12.

FIG. 21 is an exploded view of the wedge and tube for an alternate embodiment. The embodiment is depicted in FIG. 13. FIG. 21 also generally depicts the arrangement of the wedge 509 and the piston surfaces 516 for the embodiment depicted in FIG. 14. Slots 415 allow wedge 409 to radially compress against surfaces 412. Wedge 409 may comprise a nonmetallic material, such as plastic or phenolic.

Although a single form of the invention has been described herein, it will be obvious to those skilled in the art that variations may be made in the construction and relation of parts without departing from the spirit and scope of the invention described herein.

We claim:

1. A tensioner comprising:
   a first housing having a first inner surface;
   a second housing having a second inner surface and an outer surface, the outer surface slidingly engaged with the first inner surface;
   a first compressible member resisting a movement between the first housing and second housing;
   a fixed member having a first end and a second end, the first end being affixed to the first housing and being substantially parallel to a major axis of the first housing;
   a camming body describing a central hole and having a surface slidingly engaged with the second inner surface and the hole slidingly engaged with the second end; and
   a second compressible member urging the camming body against the second end, whereby the camming body is radially expandable against the second inner surface.

2. The tensioner as in claim 1, wherein:
   the camming body central hole further comprises a frustoconcical hole; and
   the fixed member second end further comprises a frustoconcical shape that cooperatively engages the frustoconical hole.

3. The tensioner as in claim 2, wherein the camming body further comprises:
   at least one slot, the slot oriented so the circumference of the camming body is variable in response to a movement against the fixed member second end.

4. The tensioner as in claim 3, wherein:
   the camming body surface further describes a pleated form; and
   the second housing second inner surface further describes a pleated form that cooperates with the pleated form of the camming body surface.

5. The tensioner as in claim 4, wherein:
   the first housing describes a cylinder; and
   the second housing describes a cylinder.

6. The tensioner as in claim 5, wherein the camming body surface comprises a nonmetallic material.

7. The tensioner as in claim 6, wherein the second compressible member bears upon the first housing.

8. The tensioner as in claim 6, wherein:
   the first compressible member comprises a spring; and
   the second compressible member comprises a spring.

9. The tensioner as in claim 6, further comprising:
   a bearing surface attached to the fixed member, the bearing surface extending normally to a fixed member bears axis; and
   the second compressible member bears upon the bearing surface.

10. A damper comprising:
    a first housing having a first housing surface;
    a wedge describing a wedge hole and having a wedge surface for slidingly engaging the first housing surface;

a second housing, the second housing coaxially and slidingly engaging the first housing;

a fixed member having a first end and a second end, the first end engaging the wedge central hole and the second end affixed to the second housing;

a first compressible member urging the wedge into contact with the fixed member first end;

a second compressible member urging the first housing away from the second housing.

11. The damper as in claim 10, wherein;

the wedge hole comprises a frustoconcical hole; and the fixed member first end comprises a frustoconical shape that cooperatively engages the frustoconical hole.

12. The damper as in claim 11, wherein the wedge further comprises:

at least one slot, the slot oriented so the circumference of the wedge is radially expandable in response to a movement against the fixed member first end.

13. The damper as in claim 12, wherein:

the wedge outer surface further describes a pleated form; and the first housing surface further describes a pleated form that cooperates with the pleated form of the wedge surface.

14. The damper as in claim 13, wherein;

the first housing further comprises a cylinder; and the second housing further comprises a cylinder.

15. The damper as in claim 14, wherein at least the wedge surface comprises a nonmetallic material.

16. The damper as in claim 15, wherein:

the first compressible member comprises a spring; and the second compressible member comprises a spring.

* * * * *

UNITED STATES PATENT AND TRADEMARK OFFICE
CERTIFICATE OF CORRECTION

| | | |
|---|---|---|
| PATENT NO. | : 6,361,459 B1 | Page 1 of 1 |
| DATED | : March 26, 2002 | |
| INVENTOR(S) | : Alexander Serkh, Andrzej Dec and David Hanes | |

It is certified that error appears in the above-identified patent and that said Letters Patent is hereby corrected as shown below:

<u>Column 5,</u>
Line 24, change "direction B" to -- direction R --

Signed and Sealed this

Eighth Day of October, 2002

Attest:

JAMES E. ROGAN
Attesting Officer     *Director of the United States Patent and Trademark Office*